Patented Aug. 19, 1941

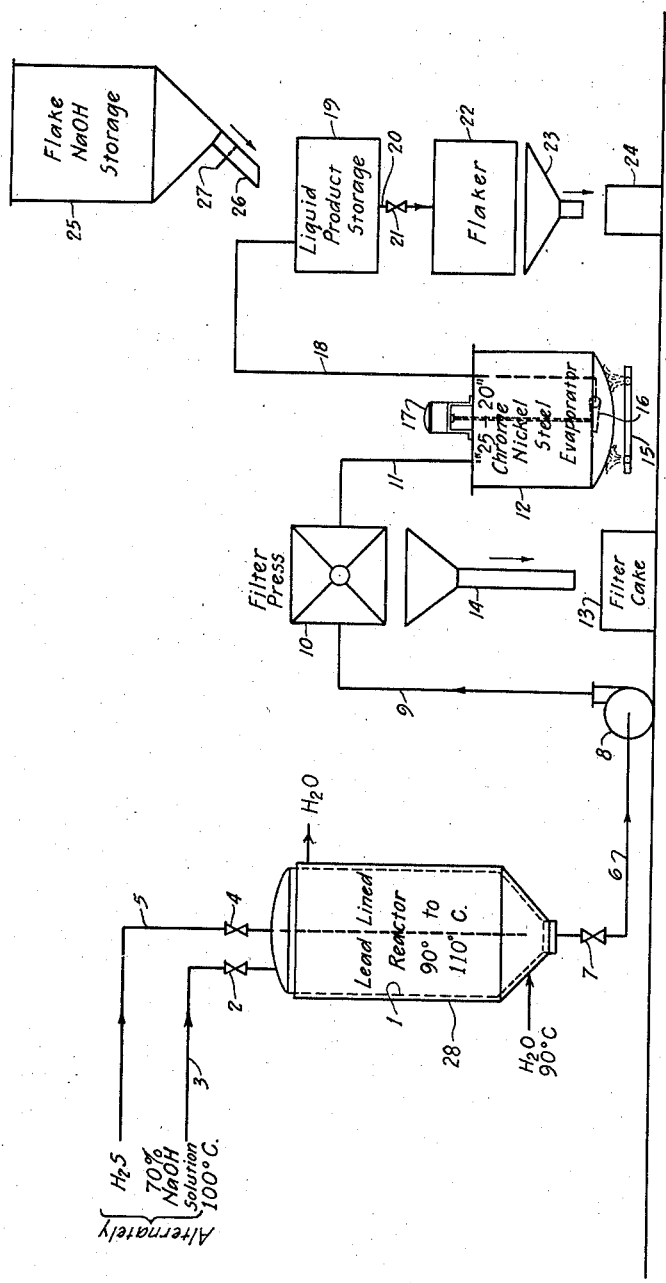

2,252,867

UNITED STATES PATENT OFFICE 2,252,867

PROCESS FOR PRODUCTION OF ALKALI METAL SULPHIDE AND HYDROSULPHIDE OF HIGH PURITY AND CONCENTRATION

James S. Sconce and Charles F. Berlinghoff, Niagara Falls, N. Y., assignors to Hooker Electrochemical Company, New York, N. Y., a corporation of New York Application April 21, 1939, Serial No. 269,186

12 Claims. (Cl. 23—134)

Sodium hydrosulphide and sulphide can be produced by reaction of hydrogen sulphide with caustic soda as follows:

$$2NaOH + H_2S \rightarrow Na_2S + 2H_2O \quad (1)$$
$$NaOH + H_2S \rightarrow NaSH + H_2O \quad (2)$$

Reaction 2 is obviously merely a continuation of Reaction 1.

Since it is difficult to react hydrogen sulphide with anhydrous caustic soda, the caustic soda, for the purpose of these reactions, may be understood to be in solution. It is possible to make and use solutions of caustic soda of concentrations up to 78 per cent, but for practical reasons a solution having a concentration of about 70 per cent is preferred. This corresponds to $NaOH \cdot .95 H_2O$. It will also be noted that water is a product of the reaction. For practical purposes therefore, these reactions should be written:

$$2(NaOH \cdot .95H_2O) + H_2S \rightarrow Na_2S \cdot 3.9H_2O \quad (3)$$
$$NaOH \cdot .95H_2O + H_2S \rightarrow NaSH \cdot 1.95H_2O \quad (4)$$

These are 52.7 and 61.5 per cent solutions respectively, which crystallize upon cooling.

Reactions 1, 2, 3 and 4 are strongly exothermic and require cooling.

Besides introducing water into the reaction, the caustic soda introduces numerous soluble impurities. Among these are traces of metals, such as iron, copper, manganese and nickel. These are not necessarily in the form of their soluble salts, but in the minute quantities in which they occur may be actually in solution or colloidal suspension in metallic form. All of these metals, even in such quantities, are objectionable in the processes for which these products are intended, but this is particularly true of the iron, which is not only catalytic but liable to cause discoloration. It is very desirable, and one of the objects of our invention, therefore, to reduce the quantity and number of these contaminants. It is known that these metals are precipitated as their sulphides from relatively weak solutions of sodium sulphide (e. g. 30 to 32 percent) produced by passing hydrogen sulphide through relatively weak solutions of caustic soda (e. g. 25 percent). When the caustic soda is of the concentration essential for our purpose (e. g. 70 percent) and the metallic contaminants such as are ordinarily brought in with the caustic soda no precipitation of metals whatever occurs in the resulting solution of sodium sulphide. However, we have discovered that when the caustic soda has been fully converted to sodium hydrosulphide by treatment with hydrogen sulphide in accordance with Reaction 4, so that no sodium sulphide remains, these impurities may be, to a large extent, precipitated. For this purpose it is necessary to continue the treatment with hydrogen sulphide for a further period until the solution turns from a reddish brown to a dark green, due to the contaminating metals having been converted to their dark sulphides, which in a yellow solution appear green. The length of this period of further treatment depends upon the degree of contamination of the solution, but may amount to as much as twenty-five per cent of the whole time of treatment. The resulting sulphides are colloidal and when first formed too fine to be filtered out. If the contamination is slight and the treatment has been relatively brief, it may be necessary to allow the solution to stand from a few minutes to an hour or more to allow the precipitate time in which to coagulate sufficiently to be removable. By this special treatment, therefore, we are enabled to remove a large proportion of the contaminants, either by filtration or by allowing the product to settle and crystallize; in which latter case the impurities will be found to be concentrated in the bottom portion.

It is also desirable and an object of our invention to reduce the water content of these products, not only to save freight in shipment, but also because sodium hydrosulphide of 60 to 62 per cent concentration becomes mushy in humid summer weather. We may use either of two methods of reducing the water content, one of which involves evaporation and the other of which does not. For example, if the product of Reaction 3 be reacted with more hydrogen sulphide, we shall have the following result:

$$Na_2S \cdot 3.9H_2O + H_2S \rightarrow 2(NaSH \cdot 1.95H_2O) \quad (5)$$

This of course is merely a continuation of Reaction 3 and the product is the 61.5 per cent product of Reaction 4. Since this product is easily melted, it may be reacted with substantially anhydrous flaked caustic soda, as follows:

$$2(NaSH \cdot 1.95H_2O) + 2NaOH \rightarrow 2(Na_2S \cdot 2.95H_2O) \quad (6)$$

This is a 59.5 per cent product as compared with the 52.7 per cent product of Reaction 3; moreover, the quantity is twice that of Reaction 3.

Similarly, if the product of Reaction 6 be reacted with more hydrogen sulphide, we shall have the following result:

$$2(Na_2S \cdot 2.95H_2O) + 2H_2S \rightarrow 4(NaSH \cdot 1.475H_2O) \quad (7)$$

This is a 67.9 per cent product, as compared with the 61.5 per cent product of Reaction 3, and again the quantity is doubled.

Hence, by alternating Reactions 6 and 7 we can go on building up the quantity of product, and also, within practical limits, its concentration. When a concentration of about 65 per cent of sodium sulphide or about 70 per cent of sodium hydrosulphide had been reached, it would be necessary to begin adding water or using a certain percentage of the caustic soda in the form of an aqueous solution, in order to continue to carry on the reaction in liquid phase at feasible temperatures. However, anhydrous caustic soda is considerably more expensive than its solutions, such as the 70 per cent solution. It is therefore desirable for economic reasons, as well as for practical reasons, to use caustic soda in the form of its solutions, rather than solid fused caustic soda, to as large an extent as compatible with production of sodium sulphide or hydrosulphide of the desired degree of concentration. Obviously one way of serving this purpose would be by concentrating the product in an evaporator. It is not practicable to concentrate sodium sulphide or hydrosulphide in steel, as the evaporator lasts only a few days. It is possible to do so in cast iron, but the product becomes badly contaminated. However, we have discovered that sodium hydrosulphide can be concentrated, substantially without decomposition or contamination, in an evaporator of chrome-nickel steel of the special "25—20" alloy which contains 25 per cent chromium and 20 per cent nickel (ordinary 18—8 alloy being unsuitable), and that it is cheaper to do so than to concentrate caustic soda beyond 70 per cent.

Our preferred process therefore begins with Reaction 4, which, however, is used only at the start of the process, for the following reasons: If the foregoing reactions are carried on in a reactor of the iron-nickel-cobalt group, serious contamination results and the reactor does not last long. This is also true of the non-ferrous metals. We find that in the case of Reactions 3 and 4, which involve fairly long contact of the reactor walls with strong caustic soda while the $H_2S$ is being bubbled in, these reactions can be practiced in a 25—20 chrome-nickel steel reactor, but this material is very expensive for this purpose. However, we find that reactions which do not involve strong concentrations of caustic soda or which take place quickly, such as Reactions 5 and 6, can be carried on in a reactor of a non-ferrous metal without contamination of the product or attack upon the reactor. One of the cheapest and best metals of this category is lead. Therefore, after starting the process with Reaction 4, we withdraw from the reactor only a portion of the hydrosulphide thereby produced and react the remainder, or as much of it as may be necessary to replace the withdrawn portion, in a lead lined reactor, with 70 per cent caustic soda solution, in accordance with the following equation:

$$NaSH \cdot 1.95H_2O + NaOH \cdot .95H_2O \rightarrow Na_2S \cdot 3.9H_2O \quad (8)$$

The product of this reaction is of course the 52.7 per cent product of Equation 3, although produced by a different reaction. This is then reacted with more hydrogen sulphide in accordance with Reaction 5, thus replenishing the hydrosulphide that was withdrawn. Thus we alternate Reactions 8 and 5, removing preferably about two-thirds of the hydrosulphide, by volume, after each alternation. The reactor is therefore never less than one-third filled with liquid, which is always largely hydrosulphide, even after Reaction 8; and since Reaction 8 is practically instantaneous, the reactor is never subjected to strong concentrations of caustic soda. In this way we are able to use a lead lined reactor and avoid increasing the iron contamination beyond that due to the iron already in the caustic soda.

Just as the contaminants may be thrown out of solution following Reaction 4, we find that they may be similarly thrown out following Reaction 5. In other words, after the metallic contaminants have been converted to their sulphides by adequate treatment with $H_2S$, they cannot remain in solution to any considerable extent in sodium hydrosulphide solutions which are free from sodium sulphide. The next step therefore is to filter the sodium hydrosulphide solution withdrawn from the lead lined reactor, to remove these impurities. It is of considerable interest to note that the filter cake is quite pyrophoric and the filter medium, which is preferably of paper, is liable to burst into flame, even while still damp. This is probably due to the presence of colloidal iron sulphide, which is known to be highly pyrophoric. The filtered hydrosulphide is then concentrated to a 70 per cent solution, represented by the formula $NaSH \cdot 1.32H_2O$, in the chrome-nickel steel evaporator above specified. If this is the product wanted, it is cooled, flaked and packed for the market. If sodium sulphide is the product wanted, it is produced by the following reaction:

$$NaSH \cdot 1.32H_2O + NaOH \rightarrow Na_2S \cdot 2.32H_2O \quad (9)$$

This is a 65 per cent product. It is then cooled, flaked and packaged for the market.

*Example*

Crude commercial sodium sulphide, prepared in accordance with Reaction 3 was converted in a lead lined reactor to the hydrosulphide in accordance with Reaction 5. The hydrosulphide was treated with an excess of $H_2S$ until the color turned to a dark green, and passed through a filter press. The filtrate was concentrated in a chrome-nickel steel evaporator and reconverted to twice the original quantity of sodium sulphide in accordance with Reaction 9. The analyses of the original, intermediate and final products were as follows:

|  | (a) Crude product of reaction 3 | (b) Crude product of reaction 5 | (c) Filter cake from b | (d) Filtrate from b | (e) Filtrate (d) after concentration | (f) NaOH (flake) | (g) Product of (e) and (f) by reaction 9 |
|---|---|---|---|---|---|---|---|
| $Na_2S\%$ | 47.2 |  | 1.8 |  |  |  | 65.0 |
| $NaSH\%$ | 7.6 | 62.0 | 45.7 | 61.0 | 71.50 |  | 4.55 |
| $NaOH\%$ |  |  |  |  |  | 96.77 |  |
| $NaCl\%$ | 1.40 | 1.17 | 12.26 | 0.26 | 0.24 | 2.97 | 1.18 |
| Fe ppm | 325.0 | 272.0 | 5,960.0 | .85 | .90 | 12.0 | 6.35 |
| Cu ppm | 1.14 | .95 | Undeter. | .50 | .40 | .90 | .80 |
| Mn ppm | 2.20 | 1.84 | Undeter. | .30 | .30 | 1.40 | .80 |
| Ni ppm | Tr. | Tr. | Undeter. | Tr. | Tr. | Tr. | Tr. |
| $Al_2O_3$ ppm | 80.0 | 67.0 | Undeter. | 3.0 | 5.0 | 73.9 | 15.0 |

Comparing columns (a) to (d) of this example, we note that the impurities of the product of Reaction 3 were carried over to Reaction 5 where they were largely precipitated. These impurities were removed by the filtration step, as shown by column (d), appearing in the filter cake, as shown by column (c). It will also be noted that there was only a negligible increase in impurities during the evaporation step, as shown by column (e). This column represents finished product, if sodium hydrosulphide is wanted. The result of converting the hydrosulphide to the sulphide in accordance with Reaction 9 is shown by columns (f) and (g). The impurities in the caustic soda are shown in column (f) and these of course carry over into the final product. Nevertheless, comparison of column (g) with column (a) shows a substantial increase in concentration and at the same time a reduction of the contaminants, especially of the iron.

Referring to the flow sheet:

1 is a jacketed lead lined reactor, in which initial Reaction 4 and subsequent alternating Reactions 5 and 8 take place. Seventy per cent caustic soda solution at 100° C., from a source not shown, is admitted through pipe 3, controlled by valve 2, alternately with hydrogen sulphide, from a source not shown, which is admitted through pipe 5, controlled by valve 4. The hydrogen sulphide is conducted to a point near the bottom of reactor 1 and bubbled through the body of liquid in the reactor. The treatment with hydrogen sulphide is continued until the solution turns a dark green, due to a black precipitate in the yellow solution, and until the resulting precipitate has had time to coagulate. Reaction 5 is decidedly exothermic. Reaction 8 is less so. Water is circulated through jacket 28 at 90° C. and this serves to cool Reaction 5 and warm Reaction 8. These reactions therefore take place at between 90° and 110° C. After each repetition of Reaction 5 a portion of the resulting sodium hydrosulphide is drawn off from reactor 1 through pipe 6 by opening valve 7, and, while still hot, forced by pump 8 through pipe 9 and filter press 10. From the filter press the hydrosulphide solution flows by gravity through pipe 11 to 25—20 chrome-nickel steel evaporator 12. The filter cake from the filter press is discharged to storage 13 through chute 14.

Evaporator 12 is heated by jets of flame from burner 15. The concentrated hydrosulphide is raised by submerged pump 16, driven by motor 17, through pipe 18 to liquid product storage 19, which is of "25—20" chrome-nickel steel. If sodium hydrosulphide is the product wanted, the solution is fed from storage 19 through pipe 20, controlled by valve 21, directly to flaker 22 whence the flaked product is delivered through chute 23 to container 24. If sodium sulphide is the product wanted, flake caustic soda from storage 25 is admitted through chute 26, which is controlled by gate 27, to liquid storage 19. The flake caustic soda reacts instantly with the hydrosulphide in liquid storage 19, converting it to the sulphide, which is flaked and packed as before.

When concentrated to a 65 per cent solution or higher and cooled to 100° C., sodium sulphide crystallizes to its monohydrate, which is 81.2 per cent sodium sulphite. The crystals, if separated from their mother liquor, will, of course, be found to have been greatly purified. Theoretically, they should be extremely pure, but such crystals are always wet with liquor, in which the contaminants are concentrated, so that the degree of purification depends to considerable extent upon the thoroughness with which the crystals are separated from their liquor. Any of the well-known processes, such as centrifuging, washing, remelting a portion and recentrifuging, may be employed for this purpose.

When evaporated to substantially a 70 per cent solution and cooled, sodium hydrosulphide crystallizes to a mixture of $NaSH \cdot 1H_2O$ and $NaSH \cdot 2H_2O$ which is about 70 per cent sodium hydrosulphide. This is a white crystalline product melting at 50 to 55° C.

When evaporated to about 80 per cent solution, the solution of sodium hydrosulphide suddenly solidifies without cooling to sodium hydrosulphide monohydrate, which is 75.6 per cent sodium hydrosulphide.

Sodium sulphide is used as a desulphuring agent in the viscose rayon industry. Sodium hydrosulphide may be used for the same purpose by first converting it to the sulphide. Metallic impurities, and in particular iron, are very objectionable in this industry as they tend to discolor and weaken the product. Our sodium sulphide and hydrosulphide of high purity are, therefore very valuable in the viscose rayon industry.

Sodium sulphide and hydrosulphide are also used for dehairing hides. The hides are immersed in a dilute solution of sodium sulphide or hydrosulphide in milk of lime for several days. The hair is softened and in some treatments actually dissolved. For this purpose the hydrosulphide is preferred, as it contains twice as much sulphur in proportion to sodium. A further advantage of the use of hydrosulphide results from its buffering action in maintaining a lower pH during the dehairing process. For example, commercial sodium sulphide may contain several per cent of sodium carbonate. In presence of a warm milk of lime suspension this will be converted to sodium hydroxide. This sodium hydroxide will attack the hide, causing excessive and irregular swelling of the different types of proteins. This weakens the leather and causes a rough, grainy appearance. When the hydrosulphide is used, even if it contains sodium carbonate, there will be no harmful effect, as the resulting sodium hydroxide is neutralized, as rapidly as formed, to sodium sulphide.

In the leather industry likewise metallic impurities are objectionable. Iron, for instance, forms insoluble deep colored tannates which stain the hides and the presence of iron and copper salts catalyzes reactions resulting in injury to the finished leather and development of objectionable odors. Our sodium sulphide and hydrosulphide of high purity are, therefore, very valuable for dehairing of hides.

We are aware that sodium hydrosulphide produced from sodium sulphide made by reduction of sodium sulphate has been filtered to remove gross impurities such as relatively coarse particles of carbon and ash introduced during the reduction; but such particles are of enormous size compared with the colloidal precipitate of metal sulphides with which we are concerned; moreover, having never been in solution they cannot be said to have been thrown out of solution or precipitated.

We claim as our invention:

1. The process for production of alkali metal sulphide of relatively high concentration and low iron content which comprises treating a substantially 70 to 78 per cent solution of the hydroxide of said alkali metal, of ordinary commercial grade and relatively high contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; and converting the resulting purified hydrosulphide to sulphide by reaction with more hydroxide of said alkali metal, but of relatively high concentration and low contamination by metals.

2. The process for production of alkali metal sulphide of relatively high concentration and low iron content which comprises treating a substantially 70 to 78 per cent solution of the hydroxide of said alkali metal, of ordinary commercial grade and relatively high contamination by metals, with hydrogen sulphide, until the hydroxide has been completeley converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from colloidal to readily filterable form; filtering out the contaminants from said solution; and converting the resulting purified hydrosulphide to sulphide by reaction with more hydroxide of said alkali metal, but of relatively high concentration and low contamination by metals.

3. The process for production of alkali metal hydrosulphide of relatively high concentration and low iron content which comprises treating a substantially 70 to 78 per cent solution of the hydroxide of said alkali metal, of ordinary commercial grade and relatively high contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; allowing the solution to cool, settle and crystallize; and separating the relatively pure upper portion from the remainder.

4. The process for production of alkali metal hydrosulphide of relatively high concentration and low iron content which comprises treating a substantially 70 to 78 per cent solution of the hydroxide of said alkali metal, of ordinary commercial grade and relatively high contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; and removing said precipitate.

5. The process for production of alkali metal hydrosulphide of relatively high concentration and low iron content which comprises treating a solution of the hydroxide of said alkali metal, of ordinary commercial concentration and grade and relatively high in contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; concentrating the solution; and allowing the solution to cool and solidify.

6. The process for production of alkali metal hydrosulphide of relatively high concentration and low iron content which comprises treating a solution of the hydroxide of said alkali metal, of ordinary commercial concentration and grade and relatively high in contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; concentrating the solution by evaporation; and allowing the solution to cool and solidify.

7. The process for production of alkali metal hydrosulphide of relatively high concentration and low iron content which comprises treating a solution of the hydroxide of said alkali metal, of ordinary commercial concentration and grade and relatively high in contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; concentrating the solution by evaporation to substantially 70 per cent; and allowing the solution to cool and solidify.

8. The process for production of alkali metal sulphide of relatively high concentration and low iron content which comprises treating substantially 70 to 78 per cent solution of the hydroxide of said alkali metal, of ordinary commercial grade and relatively high contamination by metals, with hydrogen sulphide, until the hydroxide has been completely converted to the corresponding alkali metal hydrosulphide and the color of the solution has changed from reddish brown to dark green and hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; converting the resulting purified hydrosulphide to the corresponding sulphide by reaction with more hydroxide of said alkali metal, but in anhydrous form and relatively low in contamination by metals; and allowing the resulting alkali metal sulphide to cool and solidify.

9. The process for production of alkali metal sulphide of relatively high concentration and low iron content which comprises making up a solution of the hydrosulphide by treating a solution of the hydroxide of said alkali metal, of ordinary commercial concentration and grade and relatively high in contamination by metals, with hydrogen sulphide, until the hydroxide has been completely converted to the corresponding alkali metal hydrosulphide and the color of the solution has changed from a reddish brown to a dark green and the hydrogen sulphide begun to bubble through the solution; continuing said treatment for a prolonged further period until the contaminating metals present have been substantially completely converted to their sulphides and the latter changed from a colloidal form to a readily filterable precipitate; removing said precipitate; concentrating the solution by evaporation; converting the resulting purified hydrosulphide to the corresponding sulphide by reaction with more hydroxide of said alkali metal, but in anhydrous form and relatively low in contamination by metals; and allowing the resulting alkali metal sulphide to cool and solidify.

10. The process for production of alkali metal sulphide of relatively high concentration and low iron content which comprises treating a solution of the hydroxide of said alkali metal, of ordinary commercial concentration and grade and relatively high in contamination by metals, with hydrogen sulphide, until the hydroxide has been completely converted to the corresponding alkali metal hydrosulphide and the color of the solution has changed from a reddish brown to a dark green and the hydrogen sulphide begun to bubble through the solution; continuing said treatment for a prolonged further period until the contaminating metals in said hydrosulphide have been substantially completely converted to their sulphides and the latter changed from a colloidal form to a readily filterable precipitate; removing said precipitate; concentrating the solution by evaporation; converting the resulting purified hydrosulphide to the corresponding sulphide by reaction with more hydroxide of said alkali metal, but in anhydrous form and relatively low in contamination by metals; and allowing the resulting alkali metal sulphide to cool and solidify.

11. The process for production of alkali metal sulphide of relatively high concentration and low iron content which comprises treating a substantially 70 to 78 per cent solution of the hydroxide of said alkali metal, of ordinary commercial grade and relatively high contamination by metals, with hydrogen sulphide, until the hydroxide has been completely converted to the corresponding alkali metal hydrosulphide and the color of the solution has changed from a reddish brown to a dark green and the hydrogen sulphide begun to bubble through the solution; continuing said treatment for a prolonged further period until the contaminating metals in the hydrosulphide have been substantially completely converted to their sulphides and the latter changed from a colloidal form to a readily filterable precipitate; removing said precipitate; converting the resulting purified hydrosulphide to the corresponding sulphide by reaction with more hydroxide of said alkali metal, but in anhydrous form and relatively low in contamination by metals; crystallizing the resulting sulphide out from said solution and separating the crystalline product from said solution.

12. The process for production of alkali metal hydrosulphide of relatively high concentration and low iron content which comprises: (a) treating a solution of the hydroxide of said alkali metal, of ordinary commercial concentration and grade and relatively high in contamination by metals, with hydrogen sulphide, until the hydroxide has been converted to the corresponding alkali metal sulphide; (b) treating the alkali metal sulphide with hydrogen sulphide until it has been completely converted to the corresponding alkali metal hydrosulphide and the color of the solution has changed from reddish brown to dark green and hydrogen sulphide has begun to bubble through the solution; (c) continuing said treatment for a prolonged further period until the contaminating metals in the hydrosulphide have been completely converted to their sulphides and the latter changed from a colloidal form to a readily filterable precipitate; (d) removing a part only of the resulting purified hydrosulphide together with at least a corresponding quantity of precipitate; (e) converting a part only of the remaining hydrosulphide, equal in quantity to substantially half the quantity withdrawn, to the corresponding alkali metal sulphide, by reaction with more solution of said hydroxide; continuing the process by repeating steps (b), (c), (d) and (e) in rotation; and removing the precipitate from the withdrawn hydrosulphide.

JAMES S. SCONCE.
CHARLES F. BERLINGHOFF.